United States Patent [19]

Van Vloten

[11] 4,021,818

[45] May 3, 1977

[54] LIQUID PRINTING DEVICE

[75] Inventor: Curtis P. Van Vloten, Winthrop, Mass.

[73] Assignee: Arthur D. Little, Inc., Cambridge, Mass.

[22] Filed: Sept. 22, 1975

[21] Appl. No.: 615,719

[52] U.S. Cl. .............................. 346/140 R; 346/75
[51] Int. Cl.$^2$ ........................................ G01D 15/18
[58] Field of Search .................... 346/74 S, 75, 140

[56] References Cited

UNITED STATES PATENTS

| | | | |
|---|---|---|---|
| 2,071,967 | 2/1937 | Bungner | 346/146 |
| 2,151,638 | 3/1939 | Genschmer | 346/140 |
| 2,543,047 | 2/1951 | Murray | 101/426 |
| 3,177,800 | 4/1965 | Welsh | 346/75 X |
| 3,179,042 | 4/1965 | Naiman | 346/75 X |
| 3,640,214 | 2/1972 | Scheinhutte | 346/140 UX |
| 3,655,379 | 4/1972 | Gundlach | 96/27 |
| 3,693,179 | 9/1972 | Skala | 346/140 X |

*Primary Examiner*—George H. Miller, Jr.
*Attorney, Agent, or Firm*—Schiller & Pandiscio

[57] ABSTRACT

A printing device for printing with drops of printing fluid, in which discrete droplets of a printing fluid are ejected from a printing element along a predetermined path to a recording surface. The printing element comprises a nozzle communicating with a printing fluid reservoir. A control electrode mounted on the nozzle is arranged to apply pressure pulses to printing fluid in the nozzle so as to eject discrete droplets of printing fluid from said nozzle.

6 Claims, 5 Drawing Figures

LIQUID PRINTING DEVICE

The present invention relates to graphic recording systems and more particularly to a liquid printing device.

Various devices are known in the art for printing characters or curves on a recording paper. Impact printing systems are relatively complicated, and generally are also somewhat slow due to limitations of inertia of the mechanical elements. Furthermore, such systems generally are not suited for printing curves. Another type of printing device involves the use of a liquid jet of individual, spaced ink droplets directed under pressure from a nozzle against a substrate. The control of the droplets in the ink jet is achieved through the use of one or more electrodes disposed between the nozzle and the substrate. Representative ink jet printers are described, for example, in U.S. Pat. Nos. 2,566,443 (Elmquist), 3,416,153 (Hertz) and 3,596,275 (Sweet). While such liquid jet printing devices have an advantage over purely mechanical systems in being suited for printing curves and also have substantial reduction in inertial mass as compared with purely mechanical devices, single jet printing devices may still be somewhat slow for some purposes.

In order to overcome this latter deficiency, it has been proposed to mount a plurality of ink jets in a common plane in accordance with the disclosure of U.S. Pat. No. 3,737,914, with the result that printing speed may be substantially enhanced as compared with using a single jet. However, even with the use of five or more liquid jets, the inertia of the jet foming nozzle or the liquid itself has proved to limit the maximum frequency of these devices. Furthermore, such systems are relatively expensive, and the electrical conductivity of the liquid tracing material has placed a limitation on the minimum spacing between the jets, thus limiting the resolving power of such systems.

It is thus a principal object of the present invention to provide a novel printing device for printing with drops of printing fluid which overcomes the aforesaid disadvantages of prior art printing devices. Still another object is to provide a high speed, high resolution recording system incorporating such a printing device. A further object is to provide a recording system which is relatively simple and inexpensive, and which has a minimum of moving parts and inertial mass.

Other objects of the present invention will in part be obvious and will in part appear hereinafter.

To effect the foregoing and other objects of the present invention there is generally provided a liquid printing device for printing with drops of printing fluid comprising a nozzle communicating with a printing fluid reservoir, and a control electrode mounted on the nozzle and arranged to apply pressure pulses to printing fluid in the nozzle so as to eject discrete droplets of printing fluid from said nozzle.

The invention accordingly comprises the apparatus possessing the construction, combination of elements and arrangement of parts which are exemplified in the following detailed disclosure, and the scope of the application of which will be indicated in the drawing in which.

Figure 1:
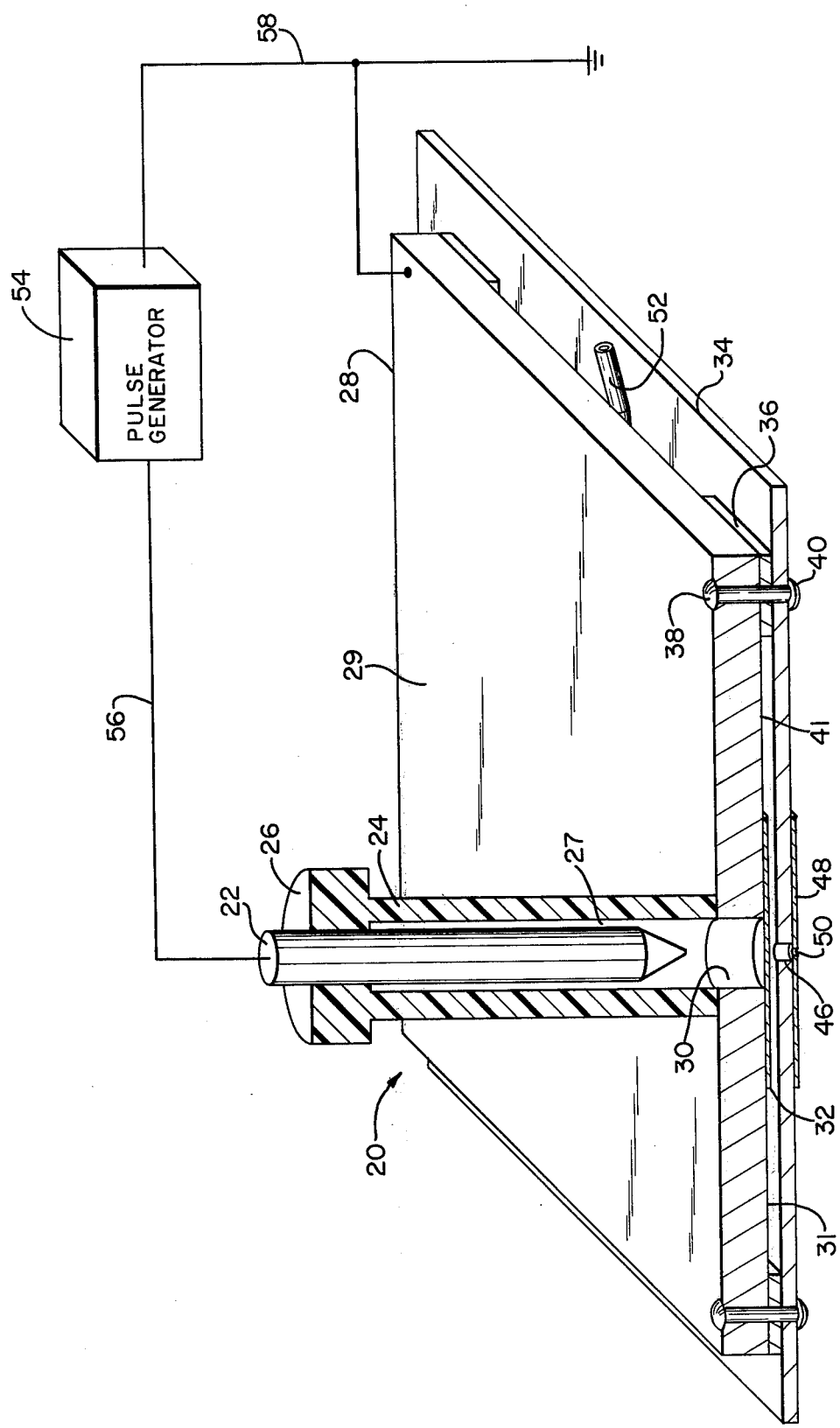
FIG. 1 is a cross sectional view in perspective, showing the principle of a single printing device in accordance with the invention.

The printing device of the present invention as shown in FIG. 1 generally at 20 comprises elongated cylindrical electrode 22 which is formed of an electrically conductive material and is mounted in a rigid, elongate barrel or hollow body 24. One end of body 24 is closed with centrally apertured cap 26 through which electrode 22 extends so that cap 26 serves as a support for electrode 22. Body 24 is dimensioned so that there is an annular interspace 27 between the external periphery of electrode 22 and the inside of body 24. Body 24 is mounted vertically on one surface 29 of a flat first plate 28. An aperture or hole 30 provided in plate 28, runs vertically through the latter as a continuation of the inside wall of body 24. Body 24 and cap 26 are both formed of dielectric material. Plate 28 is formed of an electrically conducting material such as aluminum. The other surface or underside 31 of plate 28 is covered at least in part by a thin diaphragm or flexible film 32, formed of a resiliently deformable dielectric material, such as ½ mil Mylar. Diaphragm 32 is stretched tightly across aperture 30 and is fixedly attached to underside 31 of plate 28, e.g. as by an adhesive.

First plate 28 is supported in a precisely predetermined spaced parallel relation to a metallic second or base plate 34 by means such as spacers 36. Plates 28 and 34 and spacers 36 are held together by means of bolts and mating nuts 38 and 40, respectively, mounted through suitable provided holes in spacers 36, and in the first and second plates. As will become clear from the description following, plates 28 and 34 should be spaced apart by a distance sufficient to allow the printing fluid to flow into interspace 41 between the plates and to wet both plates, but without overflowing the edge of the second or base plate. That is to say, the interspace between plates 28 and 34 should be so dimensioned that surface tension forces in the printing fluid are sufficient to cause continuous wetting of the two plates from a reservoir supply; but the plates should not be spaced so far apart that gravity forces on the printing fluid exceed the surface tension forces in the fluid. An aperture or hole 46 is provided in base plate 34, preferably concentric with aperture 30 in the upper plate 28. Aperture 46 may be the same size as aperture 30, but preferably is somewhat smaller. For example aperture 30 may constitute a round hole having a diameter of about 0.050 inch, while aperture 46 may be a round hole of only about 0.010 inch to 0.012 inch diameter.

Fixedly mounted on the bottom of base plate 34, and covering aperture 46 is a thin flat plate 48. Plate 48 is formed of a substantially rigid material such as 0.001 inch nickel shim stock. A small hole 50 is provided in the plate 48, preferably concentric with aperture 46. Hole 50 is of sufficient size so as to allow passage of printing fluid disposed to one side of hole 50 when the latter is forced through hole 50 under slight pressure, but hole 50 should not be so large as to permit any appreciable passage of fluid when pressures on both sides of the hole are substantially equal. For example, in the case where the printing fluid is water based ink, hole 50 should have a diameter of about 0.004 inches or less.

Completing the printing element are a printing fluid supply line indicated generally at 52 which provides communication between a reservoir of printing fluid and interspace 41, and an electronic pulse generator 54 one terminal of which is electrically connected to electrode 22 by a lead 56. The other terminal of the generator is connected by a lead 58 to plate 28, and to ground.

The printing element above described operates as follows:

Printing fluid such as water based ink is continuously supplied via supply line 52 from a reservoir onto the upper surface of plate 34. An electrical pulse or potential is applied to electrode 22 charging the electrode. When sufficient charge is built up on the electrode, the electrode discharges or sparks across the gap between the electrode and plate 28. The spark heats the air or other fluid enclosed in the chamber defined by body 24, hole 30, cap 26 and diaphragm 32. The heated fluid expands which causes a rapid pressure increase in the aforesaid chamber, and this in turn causes diaphragm 32 to flex outwardly, i.e. towards plate 34. The latter in turn transmits a pressure pulse across the film of ink in the vicinity of aperture 46, which in turn drives a drop of ink out of hole 50 in plate 48.

Figure 3:
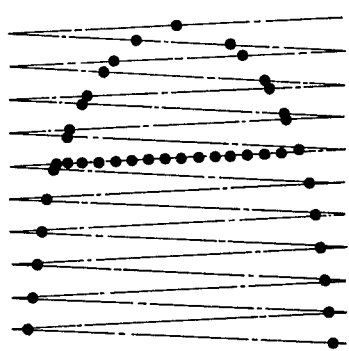
FIG. 3 shows an example of a character printed by this system.
Figure 2:
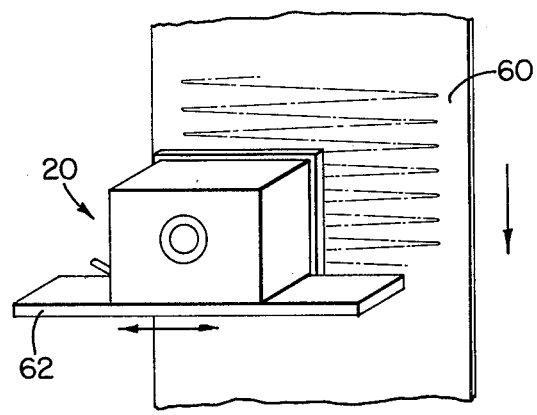
FIG. 2 shows one embodiment of the printing system of the invention incorporating a single printing device as illustrated in FIG. 1.

FIG. 2 shows a printing system incorporating the printing element just described. Referring now to FIG. 2, a printing element 20 is mounted for movement across a record carrier 60, e.g. as on a horizontal slide 62. Means (not shown) are provided for holding and moving record carrier 60, typically a paper strip. By suitable selection of time sequence of the voltage pulses produced by the generator 54, it will be apparent that alpha-numerical or other characters or tracing lines can be printed on the record carrier. An example is shown in FIG. 3 wherein the upper case letter "A" is reproduced by this method, the broken line showing the path that the printing element follows, and the broader areas showing where, the electrode having been sparked, ink droplets have made a record.

Figure 4:
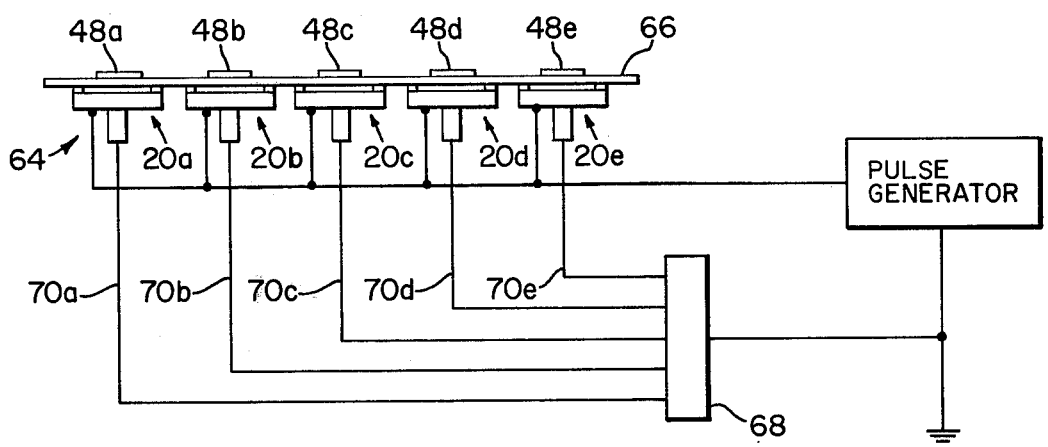
FIG. 4 shows a printing system incorporating a plurality of devices as illustrated in FIG. 1.

Reference is now made to FIG. 4 of the drawings wherein there is illustrated another embodiment of the invention in which an array, designated 64, of printing elements 20a, b, c, d, e are arranged as a printing unit on a common base plate 66 corresponding to plate 34 of the device of FIG. 1. Each element 20a, b, c, d, e, has a corresponding apertured plate 48a, b, c, d, e and all elements 20 a, b, c, d, and e are electrically insulated from the others so as to prevent an electrical pulse to one element when that element is energized, from energizing another element. The electrodes are individually connected to the control pulse generator through a selector 68 (which can simply be a group of switches) and corresponding control leads 70a, b, c, d, e. In this manner each printing element can be caused to operate independently of the others. Although not shown, it will be recognized by one skilled in the art that the array may be provided with a common ink supply, or each element may have its own ink supply.

Figure 5:
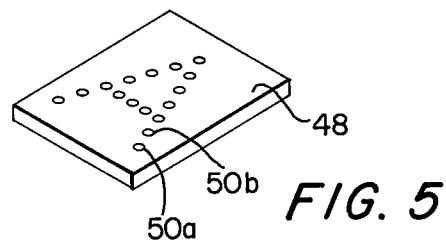
FIG. 5 is a perspective view, showing an alternative design of a printing element for incorporating into the apparatus of the present invention.

Still other changes may be made in the above apparatus, without departing from the scope of the invention herein involved. For example, the printing device may be designed to form entire alphanumeric or other shaped characters by a single pulse. An example of such an arrangement is shown in FIG. 5 wherein a plurality of holes 50a, 50b . . . are formed in base plate 48 and the holes are arranged relative to one another so as to define an alphanumeric or other character. It is thus intended that all matter contained in the above description or shown in the accompanying drawings shall be interpreted as illustrative and not in a limiting sense.

What is claimed is:

1. A printing device for printing with drops of print fluid, said device comprising in combination:
    a substantially rigid body having a hollow interior and an aperture extending between said interior and the exterior of said body;
    a pair of electrically-conductive electrodes disposed in spaced-apart relation within said interior;
    a resiliently deformable membrane disposed so as to seal said aperture;
    a base plate positioned outside said body in spaced-apart relation to said membrane so that a quantity of said printing fluid can be held to substantially fully occupy the interspace between said membrane and plate;
    said base plate having at least one hole therein adjacent said membrane, said hole being sized so as to permit passage of said printing fluid only under pressure; and
    means for supplying a printing fluid to the interspace between said membrane and said base plate.

2. A printing element as claimed in claim 1 wherein said base plate has a single hole for permitting passage of droplets of said printing fluid.

3. A printing element as claimed in claim 1 wherein said base plate has a plurality of holes for permitting passage of a plurality of discrete droplets of said printing fluid, said holes being arranged relative to one another so as to define an alphanumeric or other character.

4. A liquid printing system comprising a plurality of liquid printing devices as claimed in claim 1, electrically insulated from one another, and disposed on a common base plate, and means for selectively applying an electrical potential to one or more of said devices.

5. A printing element as claimed in claim 1 and including means for applying an electrical potential between said electrodes.

6. A printing element as claimed in claim 5 wherein said means for applying an electrical potential comprises an electrical pulse generator.

* * * * *